United States Patent [19]

Thomas et al.

[11] Patent Number: 4,792,748
[45] Date of Patent: Dec. 20, 1988

[54] TWO-TERMINAL TEMPERATURE-COMPENSATED CURRENT SOURCE CIRCUIT

[75] Inventors: David M. Thomas; Rodney T. Burt; Robert M. Stitt, II, all of Tucson, Ariz.

[73] Assignee: Burr-Brown Corporation, Tucson, Ariz.

[21] Appl. No.: 121,652

[22] Filed: Nov. 17, 1987

[51] Int. Cl.[4] .............................................. G05F 3/26
[52] U.S. Cl. ................................... 323/312; 323/315; 323/907
[58] Field of Search ............................. 323/312–316, 323/907; 330/288

[56] References Cited

U.S. PATENT DOCUMENTS

| | | | |
|---|---|---|---|
| 4,030,023 | 6/1977 | Keith | 323/313 |
| 4,302,718 | 11/1981 | Shade | 323/315 |
| 4,342,926 | 8/1982 | Whatley | 307/297 |
| 4,380,728 | 4/1983 | Kearney | 323/281 |
| 4,446,419 | 5/1984 | Van De Plassche et al. | 323/907 |
| 4,450,367 | 5/1984 | Whatley | 307/297 |
| 4,460,865 | 7/1984 | Bynum et al. | 323/313 |
| 4,472,675 | 9/1984 | Shinomiya | 323/314 |
| 4,622,512 | 11/1986 | Brokaw | 323/313 |
| 4,673,867 | 6/1987 | Davis | 323/907 |
| 4,677,368 | 6/1987 | Bynum | 323/311 |
| 4,683,416 | 7/1987 | Bynum | 323/314 |

FOREIGN PATENT DOCUMENTS

1215434 12/1986 Canada .

21649 2/1977 Japan .................................. 323/907

OTHER PUBLICATIONS

"Temperature Compensated Voltage Reference Source", Chung C. Liu, IBM Technical Disclosure Bulletin, vol. 14, No. 4, Sep. 1971, pp. 1223–1224.

Primary Examiner—William H. Beha, Jr.
Attorney, Agent, or Firm—Cahill, Sutton & Thomas

[57] ABSTRACT

A two-terminal temperature-compensated current source includes a first transistor having its emitter connected to a first terminal, its base connected to the base of a second transistor, and its collector coupled to a current mirror. The second transistor has its emitter coupled to the first terminal by a first resistor and its collector coupled to the current mirror. A second resistor is coupled between the first terminal and the base of the first transistor. The current mirror is coupled between a second terminal and the collectors of the first and second transistors so that all current supplied to the current mirror from the second terminal flows into the collectors of the first and second transistors. A third transistor has its base coupled to the collector of the first transistor, its emitter coupled to the base of the first transistor, and its collector coupled to the second terminal. The current in the first resistor has a positive temperature coefficient, and the current in the second resistor has a negative temperature coefficient. The temperature coefficient of the total current flowing between the first and second terminals is adjusted by adjusting the ratio between the first and second resistors.

19 Claims, 3 Drawing Sheets

TWO-TERMINAL TEMPERATURE-COMPENSATED CURRENT SOURCE CIRCUIT

BACKGROUND OF THE INVENTION

The invention relates to temperature-compensated current sources, and more particularly to two-terminal current sources that include (1) "$\Delta V_{BE}$ over R" circuits generating a first current with a positive temperature coefficient, and (2) other circuitry, such as a $V_{BE}$ voltage applied across a resistor, generating a second current with a negative temperature coefficient, in which the first and second currents are summed to produce the total temperature-compensated current flowing through the two-terminal current source.

Many analog circuits and systems require a two-terminal current reference circuit that is insensitive to the "compliance voltage", i.e. the voltage between the two terminals of the current source, the current of which has a zero or selectable temperature coefficient. (As used herein, the term "two-terminal reference circuit" or "two-terminal current source" refers to a two-terminal circuit which receives only a certain current from a first terminal and applies only that same current to a second terminal.)

One typical application for a two-terminal current source would be to provide a bias current for a leg of a bridge circuit. Another typical application would be a bipolar integrated circuit including a number of PNP current mirror circuits and a number of NPN current mirror circuits which all are controlled in response to a single two-terminal current source, such as a JFET.

U.S. Pat. No. 4,460,865 (Bynum, et al.) discloses a precise temperature-compensated voltage reference circuit that generates a voltage $V_{BE}$ having a negative temperature coefficient and a voltage $\Delta V_{BE}$ having a positive temperature. The voltage $V_{BE}$ is applied across a first resistor to produce a current with a negative temperature coefficient. The voltage $\Delta V_{BE}$ is applied across a second resistor to produce a current having a positive temperature coefficient. The two currents are summed to produce a control current that is forced through a third resistor. A first terminal of the third resistor is connected to a supply voltage conductor, and a second terminal of the third resistor produces a temperature-compensated reference voltage. By properly scaling the first and second resistors, a wide range of temperature coefficients can be selected for the output reference voltage. The first and second resistors are connected to a ground voltage conductor. Components controlling the currents flowing through the transistors generating the $V_{BE}$ voltage and the $\Delta V_{BE}$ voltage are connected to a positive supply voltage. Although this circuit functions adequately as a temperature-compensated voltage reference circuit, it is not practical for use as a two-terminal reference current source the terminal voltages of which may be indeterminate, because an electrically floating power supply referenced to one of the reference current source terminals would be required.

U.S. Pat. No. 4,472,675 (Shinomiya) discloses a reference voltage generating circuit, the terminals of which are connected to a ground voltage conductor T2 and a positive supply reference voltage conductor T1. The circuit generates a $\Delta V_{BE}$ voltage across a first resistor, to generate a first current having a positive temperature coefficient. A second circuit generates a $V_{BE}$ voltage across a second resistor to generate a second current having a negative temperature coefficient. The first current is utilized to drive a first current mirror circuit to generate a third current having a positive temperature coefficient, and the second current is used to drive a second current mirror circuit to generate a fourth current having a negative temperature coefficient. The third and fourth currents are summed, and the resulting current flows through a third resistor to the ground voltage conductor to generate a temperature-compensated reference voltage. The temperature dependence of this reference voltage can be selected by selecting resistance values of the first and second resistors. This circuit is complex, as it includes 13 transistors and three resistors.

Although the Shinomiya reference contains no suggestion that the circuit disclosed therein could be connected as a two-terminal current source, the current flowing from the positive power supply into terminal T1 is the same current that flows out of terminal T2 into the ground reference conductor, and this current represents the sum of the five "positive-temperature-coefficient" currents flowing through transistors Q9, Q10, Q11, Q12, and Q13, and the sum of the "negative-temperature-coefficient" currents flowing through transistors Q5, Q6, and Q7. The large number of transistors of this circuit would cause it to occupy far too much semiconductor chip area to be practical as a two-terminal current source. The large number of current mirrors would cause currents flowing through terminals T1 and T2 to have more noise than would be acceptable in many circuits that might require a precision temperature-compensated two-terminal current source. The Shinomiya technique for coupling the $\Delta V_{BE}$ generating circuitry and the $V_{BE}$ generating circuitry requires that the two transistors directly generating the $\Delta V_{BE}$ voltage and the one transistor generating the $V_{BE}$ voltages be located sufficiently far apart that thermal temperature gradients in the silicon would introduce another source of error. Furthermore, if the Shinomiya circuit were to be used as a two-terminal current source, an unduly complex start-up circuit would have to be provided to supply initial currents to the many transistor collectors that initially would be electrically "floating". The start-up circuit would have to be such that its influence on the various collector currents would be negligible after start-up operation was complete. These considerations make it even more impractical to use the Shinomiya circuit as a two-terminal current source.

There is an unmet need for a simple, highly precise, low noise two-terminal temperature compensated current source circuit having a high degree of voltage compliance.

SUMMARY OF THE INVENTION

Accordingly, it is an object of the invention to provide an improved temperature-compensated two-terminal current source circuit.

It is another object of the invention to provide an inexpensive two-terminal temperature-compensated current source in which the temperature coefficient can be adjusted by trimming resistor values.

It is another object of the invention to provide an inexpensive temperature-compensated two-terminal current source circuit having low compliance voltage and low sensitivity to variations in compliance voltage.

It is another object of the invention to provide a simple, inexpensive two-terminal temperature-compensated current reference circuit having a very low level of noise.

It is another object of the invention to provide a simple two-terminal temperature-compensated current reference circuit which avoids inaccuracy due to thermal gradients in semiconductor material in which the circuit is fabricated.

It is another object of the invention to provide a two-terminal temperature-compensated current source in which simple start-up circuitry can be used which does not affect normal operation.

Briefly described, and in accordance with one embodiment thereof, the invention provides a two-terminal current source that includes first and second terminals, first, second, and third transistors each having a base, an emitter, and a collector, the emitter area of the second transistor being greater than that of the first transistor and the bases of the first and second transistors being connected together and developing a $V_{BE}$ voltage across a first resistor coupled between the emitter of the second transistor and the second terminal, the emitter of the first transistor being connected to the second terminal, the collectors of the first and second transistors receiving equal currents from a current mirror circuit receiving all of its current from the first terminal. A second resistor is coupled between the base and emitter of the first transistor. A third transistor having a control electrode coupled to the collector of the first transistor and a first current-carrying electrode coupled to the base of the first transistor has a second current-carrying electrode connected to the first terminal. A constant current having a positive temperature coefficient flows through the collector of the second transistor, and a current having the same magnitude and the same positive temperature coefficient flows through the collector of the first transistor. A current having a negative temperature coefficient flows through the second resistor and the first and second current-carrying terminals of the third transistor. The currents flowing through the first and second terminals therefore have a temperature coefficient determined by the ratio of the resistances of the first and second resistors. In one described embodiment of the invention, amplifier circuitry is interposed between the current mirror and the collectors of the first and second transistors to reduce beta errors and noise produced by typical lateral PNP current mirror circuits. Several start-up circuits are disclosed to ensure an initial current path between the first and second terminals. In another embodiment of the invention, the second resistor is coupled between the base and emitter of a transistor in the current mirror rather than between the base and emitter of the first transistor. In another embodiment of the invention, a two-terminal constant current source includes first circuitry developing a zener diode voltage drop across a first resistor to obtain a first current having a low magnitude, very linear positive temperature coefficient, and second circuitry developing a $V_{BE}$ voltage drop across a second resistor to obtain a second current having a negative temperature coefficient. The first and second currents are summed to provide a very accurate current between the two terminals with a temperature coefficient selected by the ratio of the first and second resistors. In yet another embodiment, a negative temperature coefficient component of current in a two-terminal current source is produced by developing a gate-to-source voltage of a JFET across a resistor.

DETAILED DESCRIPTION OF THE INVENTION

Figure 1:
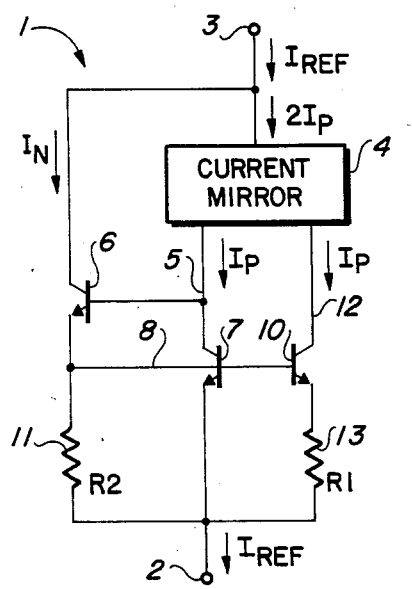
FIG. 1 is a schematic circuit diagram of the temperature-compensated two-terminal current source circuit of the present invention.

Referring to FIG. 1, two-terminal current source 1 includes terminals 2 and 3. The temperature-compensated reference current $I_{REF}$ flows out of terminal 2 and into terminal 3. (Of course, the transistor types can be reversed, i.e., from NPN to PNP, and the direction of $I_{REF}$ can be reversed.) Terminal 3 is connected to a current mirror circuit 4. Two equal currents $I_P$ each having a positive temperature coefficient flow through conductors 5 and 12 into the collectors of NPN transistors 7 and 10, respectively. Conductor 5 also is connected to the base of NPN transistor 6, the base current of which is negligible. The collector of transistor 6 is connected to terminal 3. The emitter of transistor 6 is connected by conductor 8 to the base electrodes of NPN transistors 7 and 10 and to one terminal of resistor 11, the resistance of which is R2. The other terminal of resistor 11 is connected to terminal 2. The emitter of transistor 7 is connected to terminal 2. The emitter of transistor 10 is coupled by resistor 13, the resistance of which is R1, to terminal 2.

Resistors R1 and R2 can be temperature-insensitive nichrome resistors. A current $I_N$ has a negative temperature coefficient and flows through the collector-emitter path of transistor 6 and through resistor R2. Therefore, $I_{REF}$ is equal to the sum of $I_N$ plus $2I_P$.

The emitter area of transistor 10 is N times greater than the emitter area of transistor 7, where N typically is in the range from 2 to 20. Since the same collector current $I_P$ flows through transistors 7 and 10, the base-to-emitter voltage $V_{BE}(10)$ of transistor 10 is less than the base-to-emitter voltage $V_{BE}(7)$ of transistor 7. The difference in $V_{BE}$ voltages is referred to as $\Delta V_{BE}$. (The circuitry including transistors 7 and 10 and resistor R1 is referred to as a "$\Delta V_{BE}$ over R" circuit.) As those skilled in the art know, $\Delta V_{BE}$ is proportional to the absolute temperature T. For silicon transistors, $\Delta V_{BE}$ is equal to approximately +3300 parts per million (ppm) per degree Centigrade. Therefore, $I_P$ (which is equal to $\Delta V_{BE}$ divided by R1) is "forced" by transistor 10 to flow out of current mirror circuit 4 through conductor 12. Current mirror circuit 4 causes an identical current $I_P$ to flow through conductor 5 into the collector of transistor 7.

The same transistor 7 that generates $\Delta V_{BE}$ also generates a voltage $V_{BE}(7)$ across resistor R2, producing the current $I_N$ through resistor R2, where $I_N$ is equal to $V_{BE}(7)$ divided by R2. (The circuitry including transistors 6 and 7 and resistor R2 is referred to as a "$V_{BE}$ over R" circuit.) The base currents of transistors 7 and 10 do not affect the temperature coefficient of $I_P$.

Thus, it can be seen that the circuit of FIG. 1 provides a two-terminal constant current source which contains a "mix" of the positive temperature coefficient currents $I_P$ and the negative temperature coefficient current $I_N$. Those skilled in the art know that the temperature coefficient of $V_{BE}(7)$ for silicon transistors is −3500 ppm per degree Centigrade. The temperature coefficient of $I_{REF}$ can be set to any value between −3500 ppm per degree Centigrade and +3300 ppm per degree Centigrade by appropriately selecting the resistances R1 and R2. Resistors R1 and R2 typically are composed of nichrome having a temperature coefficient of approximately zero and are readily laser trimmable.

Figure 2:
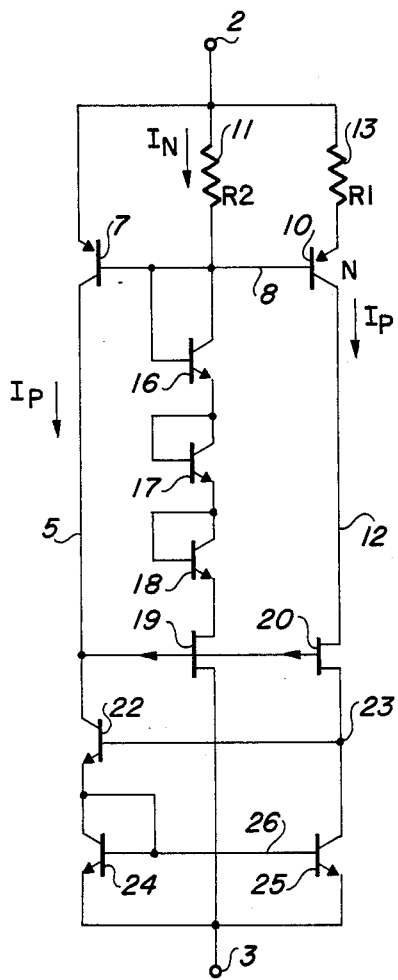
FIG. 2 is a schematic circuit diagram of another embodiment of the invention.

It can be seen readily that the voltage compliance sensitivity of the two-terminal current source circuit 1 is low, since both $I_P$ and $I_N$ are essentially independent of the terminal voltages on terminals 2 and 3 as long as the voltage of terminal 3 is at least $3V_{BE}$ higher than the voltage of terminal 2. There is no requirement that either terminal 2 or 3 be connected to a ground voltage conductor or a positive supply voltage conductor or that an electrically "floating" power supply be referenced to either terminal 2 or 3, as would be required for many prior art voltage reference circuits that are known in the art. FIG. 2 shows an embodiment of the invention in which the $V_{BE}$ and $\Delta V_{BE}$ voltages are generated by PNP transistors, rather than NPN transistors. To ensure an initial starting current, conductor 8 is coupled to terminal 3 by the series connection of three diode-connected transistors 16, 17, and 18 and an "on" P channel JFET (junction field effect transistor) 19, the source of which is connected to the emitter of transistor 18 and the drain of which is connected to terminal 3 to provide a continuous electrical path between conductor 8 and terminal 3. The gate electrode of JFET 19 is connected to conductor 5. A second P channel JFET 20 has its gate electrode connected to conductor 5, its source electrode connected to conductor 12, and its drain electrode connected by conductor 23 to the collector of NPN current mirror transistor 25, the emitter of which is connected to terminal 3. NPN transistor 22 has its collector connected to conductor 5, its base connected to conductor 23, and its emitter connected to the base and collector of NPN current mirror control transistor 24. The emitter of transistor 24 is connected to terminal 3. The base of current mirror transistor 25 is connected to the base of transistor 24 by conductor 26. (Transistors 22, 24, and 25 form a Wilson current mirror.) In the circuit of FIG. 2, the connection of JFET 20 considerably increases the output impedance of the two-terminal current source circuit of FIG. 2. The negative-temperature-coefficient current $I_N$ flows through diode-connected transistors 16–18 and JFET 19 from resistor R2 to terminal 3. The positive-temperature-coefficient current $I_P$ flow as in FIG. 1. The gate electrode currents and the base electrode currents are all negligible.

Figure 3:
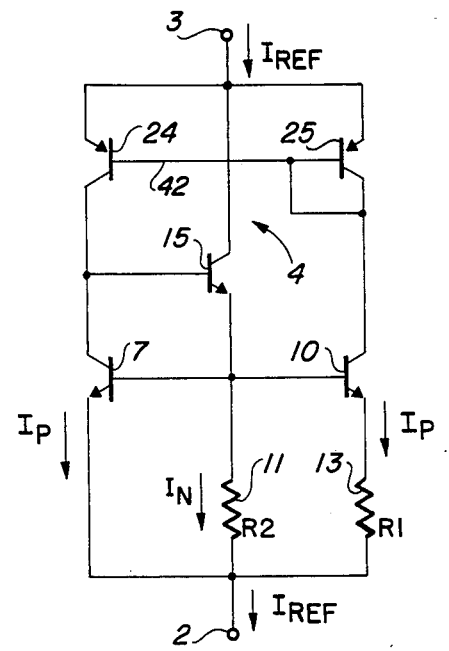
FIG. 3 is a schematic diagram of another embodiment of the invention.

The circuitry of the two-terminal circuit source of FIG. 1 can be very simple, the simplest version being shown in the circuit of FIG. 3, wherein the current mirror circuit 4 includes only two PNP transistors 24 and 25. The same transistor 7 generates both the $V_{BE}$ voltage that produces the negative temperature coefficient current $I_N$ and the positive temperature coefficient current $I_P$. Therefore no errors can be caused by thermal gradients with the semiconductor chip in which the two-terminal current source is fabricated, if geometric centers of transistors 7 and 10 are at the same point. This can be accomplished by positioning half of the active emitter area of the larger transistor 10 on opposite sides of transistor 7. The small number of transistors of this two-terminal current source causes it to be a low noise circuit. Since the above-described two-terminal current source circuit requires only a few transistors and resistors, it can be used wherever needed in an integrated circuit without a great deal of concern about the amount of chip area required.

Figure 4:
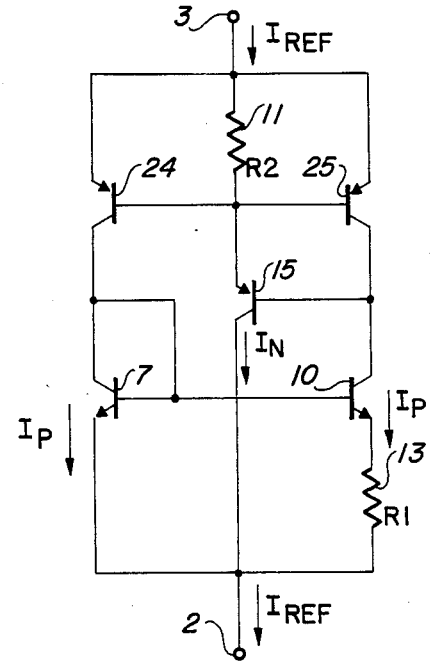
FIG. 4 is a schematic diagram of another embodiment of the invention.

The circuit of FIG. 4 is the same as the circuit of FIG. 3, except that the $V_{BE}$ voltage used to produce $I_N$ is developed by the PNP current mirror transistors 24 and 25 instead of "$\Delta V_{BE}$-generating" transistor 10.

Figure 5:
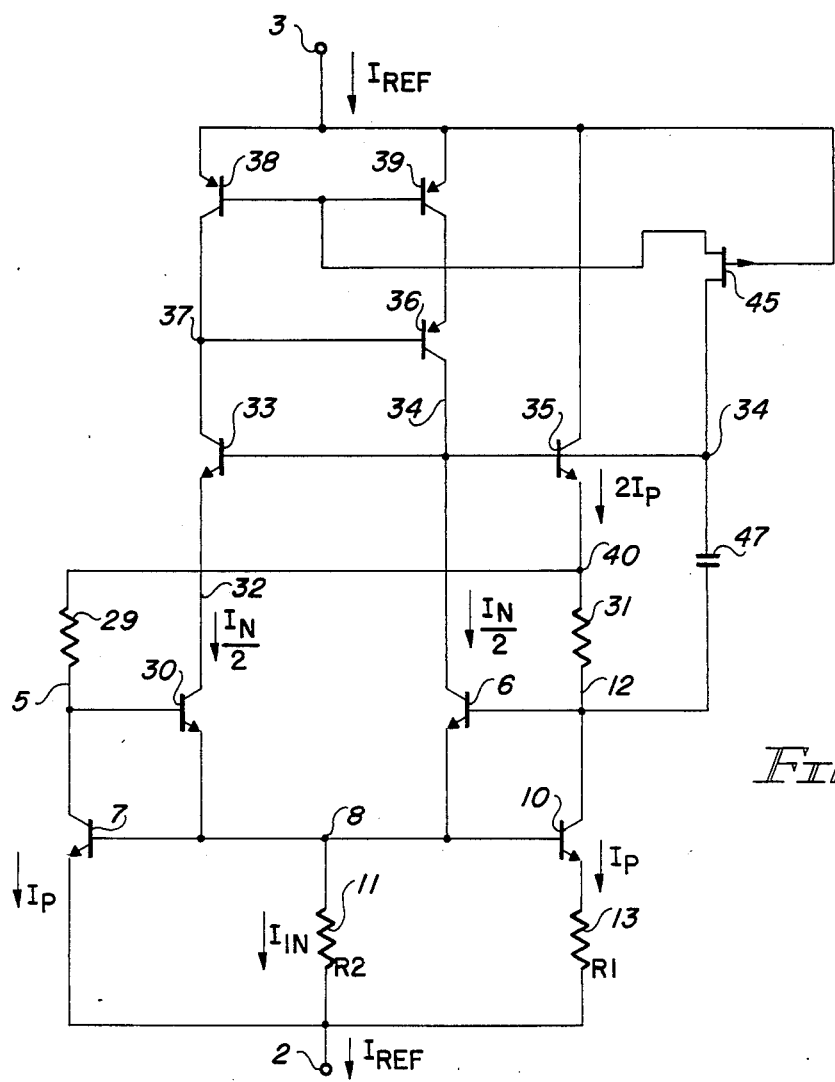
FIG. 5 is a schematic circuit diagram of another embodiment of the invention.

The circuits shown in FIGS. 3 and 4 utilize PNP current mirror circuits. At the present state-of-the-art, PNP current mirror circuits are usually implemented with lateral PNP transistors, which are readily available in most conventional bipolar integrated circuit manufacturing processes. However, such PNP current mirror circuits are well-known to exhibit beta errors and noise which cause inaccuracies in the linearity of temperature drift of current sources and increase the amount of noise of current reference circuits. FIG. 5 shows a circuit of an embodiment of the invention which provides feedback and gain in the "load" circuitry connected to the collectors of transistors 7 and 10 to reduce the inaccuracies caused by the above-mentioned beta errors and noise produced by lateral PNP current mirror circuits.

In FIG. 5, the collector of transistor 7 is connected by conductor 5 to the base of NPN transistor 30 and to one terminal of resistor 29, the other terminal of which is connected by conductor 40 to the emitter follower NPN transistor 35. The emitter of transistor 30 is connected by conductor 8 to the bases of transistors 7 and 10 and to resistor R2. The collector of transistor 30 is connected to the emitter of NPN transistor 33, the base of which is connected by conductor 34 to the collector of PNP transistor 36 and the base of emitter follower transistor 35. The collector of transistor 33 is connected by conductor 37 to the collector of PNP current mirror transistor 38 and to the base of PNP transistor 36. The emitter of transistor 36 is connected to the collector and base of PNP current mirror transistor 39, and the collector of transistor 36 is connected to conductor 34. The emitters of transistors 38 and 39 are connected to terminal 3.

The collector of transistor 10 is connected by conductor 12 to the base of NPN transistor 6 and to one terminal of nichrome resistor 31, the other terminal of which is connected to conductor 40. The collector of transistor 6 is connected to conductor 34. The emitter of transistor 6 is connected to conductor 8. The collector of emitter follower transistor 35 is connected to terminal 3. P channel JFET 45 has its gate electrode connected to terminal 3, its source connected to the emitter of transistor 36, and its drain connected to conductor 34. Capacitor 47 is coupled between conductor 34 and conductor 12 to provide frequency compensation.

JFET 45 provides an initial current to conductor 34 to ensure initial start-up.

In FIG. 5 transistors 6 and 30 form a differential input stage of what is in effect an operational amplifier having its differential inputs connected to conductors 5 and 12. Identical nichrome resistors 29 and 31 provide a feedback loop to input conductors 5 and 12 from conductor 40, which functions as the output of the operational amplifier being referred to. PNP current mirror transistors 38 and 39 function as high impedance load devices for the operational amplifier, each of which supplies a current $I_{N/2}$ that flows through the collectors of transistors 30 and 6 and is summed to produce the negative-temperature-coefficient current $I_N$ flowing through resistor R2. Transistors 36, 38 and 39 function as a Wilson current mirror, well-known by those skilled in the art to provide a high impedance and eliminate beta errors. Transistor 33 performs the function of keeping the collector-base voltage of transistor 30 constant despite variations in terminal voltages of the two-terminal current source, improving its accuracy. If a voltage difference appears between conductors 5 and 12, the gain of the above-described operational amplifier produces a corresponding amplified, inverted change on conductor 34. Emitter follower transistor 35 couples this change to conductor 40 to supply whatever currents are needed by resistors 29 and 31 and to cause those two currents to be equal. A feedback loop, including transistors 7 and 10 and resistor R1, operates to determine the magnitude of $I_P$, while the operational amplifier referred to keeps the currents through the collectors of transistors 7 and 10 equal.

Figure 6:
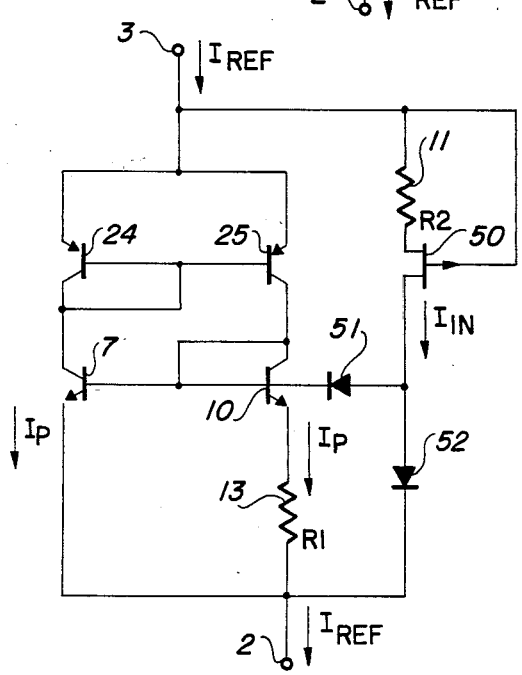
FIG. 6 is a schematic diagram of another embodiment of the invention including a $\Delta V_{BE}$ current source having a positive temperature coefficient and a JFET current source having a negative temperature coefficient.

FIG. 6 shows an alternate embodiment of the invention in which $I_P$ is developed by a "$\Delta V_{BE}$ over R" circuit including NPN transistors 7 and 10 and nichrome resistor R1, as in the above-described circuits. However, the negative-temperature-coefficient current $I_N$ is produced by the connection of P channel JFET 50 in series with resistor 11. The gate of JFET 50 is connected to terminal 3, as is the upper terminal of nichrome resistor R2. The drain electrode of JFET 50 is connected to the anodes of diodes 51 and 52. The cathode of diode 51 is connected to the bases of transistors 7 and 10. The cathode of diode 52 is connected to conductor 2. Diodes 51 and 52 ensure initial start-up of this two-terminal current source.

Figure 7:
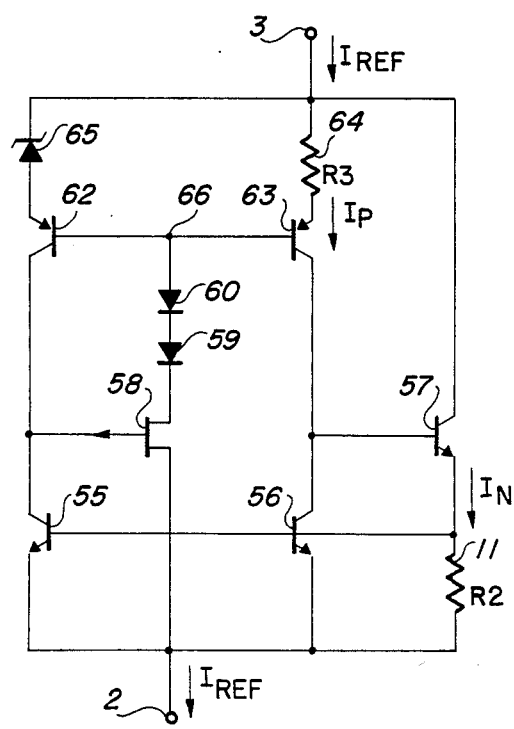
FIG. 7 is a schematic diagram of another embodiment of the invention utilizing a zener diode to generate a current source with a positive temperature coefficient and a $V_{BE}$ voltage to generate a current source with a negative temperature coefficient.

FIG. 7 shows another embodiment of the invention in which the positive-temperature-coefficient current $I_P$ is developed by applying the very linear reverse voltage of a zener diode 65 across a nichrome resistor 64, the resistance of which is R3. Diodes 59 and 60 and JFET 58 produce a bias voltage on conductor 66, which is connected to the bases of PNP transistors 62 and 63. The negative-temperature-coefficient current $I_N$ is produced by applying the $V_{BE}$ voltage of NPN transistors 55 and 56 across resistor R2. In this circuit, $I_P$ has a temperature coefficient of +300 ppm per degree Centigrade, while $I_N$ has a negative temperature coefficient of −3300 ppm per degree Centigrade, with the total current coefficient of $I_{REF}$ being adjustable in the range between these two limits. The positive temperature coefficient of $I_P$ in this circuit is low in magnitude and is very linear from −55° Centigrade to +125° Centigrade, so a very linear, temperature-compensated total current between the two terminals 2 and 3 can be obtained by switchably ratioing R2 and R3.

While the invention has been described with reference to a particular embodiment thereof, those skilled in the art will be able to make various modifications to the described embodiment of the invention without departing from the true spirit and scope thereof. It is intended that all elements and steps which perform substantially the same function in substantially the same manner to achieve the same result are within the scope of the invention.

I claim:

1. A two-terminal current source comprising in combination:
   (a) first and second terminals;
   (b) first, second and third transistors, the first and second transistors each having a base, a collector, and an emitter, the second transistor having a substantially greater emitter area than the first transistor, the third transistor having a control electrode, a first current-carrying electrode, and a second current-carrying electrode, the base of the first transistor being connected to the base of the second transistor, the first current-carrying electrode, control electrode, and second current-carrying electrode of the third transistor being coupled to the base of the first transistor, the collector of the first transistor, and the first terminal, respectively, the emitter of the first rransistor being coupled to the second terminal;
   (c) first resistive means coupled between the emitter of the second transistor and the second terminal for producing a first current in the collector of the second transistor;
   (d) second resistive means coupled between the first current-carrying electrode of the third transistor and the second terminal for producing a second current in the first and second current-carrying electrodes of the third transistor;
   (e) current mirroring means coupled to the collectors of the first and second transistors and the first terminal for producing a third current in the collector of the first transistor that is proportional to the first current, whereby the first and third currents have a positive temperature coefficient and the second current has a negative temperature coefficient, and a current flowing in the first and second terminals has a temperature coefficient determined by the ratio of resistances of the first and second resistive means.

2. The two-terminal current source of claim 1 wherein the current mirroring means includes a fourth transistor having a first current-carrying electrode coupled to the first terminal, a second current-carrying electrode coupled to the collector of the first transistor, and a control electrode coupled to its second current-carrying electrode, and a fifth transistor having a first current-carrying electrode coupled to the first terminal, a second current-carrying electrode coupled to the collector of the second transistor and a control electrode coupled to the control electrode of the fourth transistor.

3. The two-terminal current source of claim 1 wherein the current mirroring means includes a fourth transistor having a first current-carrying electrode coupled to the first terminal, a second current-carrying electrode coupled to the collector of the second transistor, and a control electrode coupled to its second current-carrying electrode, and a fifth transistor having a first current-carrying electrode coupled to the first terminal, a second current-carrying electrode coupled to the collector of the first transistor and a control electrode coupled to the control electrode of the fourth transistor.

4. The two-terminal current source of claim 1 including a fourth transistor having a first current-carrying electrode coupled to the current mirroring means, a second current-carrying electrode coupled to the collector of the second transistor, and a control electrode coupled to the collector of the first transistor.

5. The two-terminal current source of claim 1 wherein the third transistor is a bipolar transistor, and its control electrode is a base, its first current-carrying electrode is an emitter, and its second current-carrying electrode is a collector.

6. The two-terminal current source of claim 1 when the third transistor is a field effect transistor, its control electrode is a gate, one of its first and second current-carrying electrodes is a source and the other of its current-carrying electrodes is a drain.

7. The two-terminal current source of claim 1 including a fourth transistor, wherein the third and fourth transistors are NPN transistors, the fourth transistor having an emitter coupled to the emitter of the third transistor and the base of the second transistor, the third and fourth transistors forming a differential amplifying circuit including the current mirroring means connected as a load circuit for the third and fourth transistors, the differential amplifying circuit including a fifth transistor having a base, an emitter, and an output node connected to the collector of one of the third and fourth transistors and to the base of the fifth transistor, the emitter of the fifth transistor being coupled by third and fourth resistors to supply the first and third currents to the collectors of the first and second transistors.

8. A two-terminal current source comprising in combination:
 (a) first and second terminals;
 (b) first, second and third transistors, the first and second transistors each having a base, a collector, and an emitter, the second transistor having a substantially greater emitter area than the first transistor, the third transistor having a control electrode, a first current-carrying electrode, and a second current-carrying electrode, the base of the first transistor being connected to the base of the second transistor;
 (c) first resistive means coupled between the emitter of the second transistor and the second terminal for producing a first current in the collector of the second transistor;
 (d) current mirroring means coupled to the collectors of the first and second transistors and the first terminal for producing a second current in the collector of the first transistor that is proportional to the first current;
 (e) second resistive means for producing a third current, coupled in series with the first and second current-carrying electrodes of the third transistor between the first and second terminals so that the third current flows through the first and second terminals;
 whereby the first and second currents have a positive temperature coefficient and the third current has a negative temperature coefficient, and a current flowing in the first and second terminals has a temperature coefficient determined by resistances of the first and second resistive means.

9. The two-terminal current source of claim 8 wherein one of the first and second current-carrying electrodes of the third transistor is connected to one of the first and second terminals.

10. The two-terminal current source of claim 8 wherein the current mirroring means includes a current mirroring transistor having a base, an emitter coupled to the second terminal, and a collector coupled to the control electrode of the third transistor and the collector of the second transistor, the second resistive means being coupled between the base and emitter of the current mirroring transistor.

11. A two-terminal constant current source comprising in combination:
 (a) first and second terminals;
 (b) first current source means coupled between the first and second terminals for receiving only a positive temperature coefficient current from the first terminal and supplying only the positive temperature coefficient current to the second terminal, the first current source means receiving and supplying no current other than the positive temperature coefficient current;
 (c) second current source means coupled between the first and second terminals for receiving only a negative temperature coefficient current from the first terminal and supplying only the negative temperature coefficient current to the second terminal, the second current source means receiving and supplying no current other than the negative temperature coefficient current;
 (d) means for selectively controlling the magnitudes of the positive and negative temperature coefficient currents, to thereby control a temperature coefficient of a constant total current equal to the sum of the positive and negative temperature coefficient currents flowing through the first and second terminals, the constant total current being the only current flowing through either of the first and second terminals.

12. The two-terminal current source of claim 11 wherein the first current source means includes a zener diode circuit producing a positive temperature coefficient voltage drop and means for applying that voltage drop across a first resistor to produce the positive temperature coefficient current.

13. The two-terminal current source of claim 12 wherein the second current source means includes a circuit producing a $V_{BE}$ voltage having a negative temperature coefficient and means for applying that voltage to a second resistor to produce the negative temperature coefficient current in the second resistor.

14. A method of producing a constant temperature-compensated current in first and second terminals to thereby provide a two-terminal current source, the method comprising the steps of:
 (a) supplying from the first terminal only a positive temperature coefficient current into a first current source circuit and supplying from the first current source circuit only the positive temperature coefficient current to the second terminal, the first current source receiving and supplying no current other than the positive temperature coefficient current;
 (b) supplying from the first terminal only a negative temperature coefficient current into a second current source circuit and supplying from the second current source circuit only the negative temperature coefficient current to the second terminal, the second current source circuit receiving and supplying no current other than the negative temperature coefficient current; and (c) selectively controlling the magnitudes of the positive and negative temperature coefficient currents, to control a temperature coefficient of a constant total current flowing through the first and second terminals, the total current being equal to the sum of the positive and negative temperature coefficient currents, the constant total current being the only current flowing through the first and second terminals.

15. The method of claim 14 wherein step (a) includes supplying the positive temperature coefficient current into a $\Delta V_{BE}$ over R circuit including a resistor.

16. The method of claim 14 wherein step (b) includes supplying the negative temperature coefficient current into a $V_{BE}$ over R circuit including a resistor.

17. The method of claim 14 wherein step (a) includes supplying the positive temperature coefficient current to a zener diode circuit producing a zener diode voltage drop and supplying the zener diode voltage drop across a resister.

18. The method of claim 14 wherein step (a) includes supplying the positive temperature coefficient current to a $\Delta V_{BE}$ over R circuit including a first resistor in the first current source circuit, and step (b) includes supplying the negative temperature coefficient current to a $V_{BE}$ over R circuit including a second resistor in the second current source circuit.

19. The method of claim 18 including operating a transistor that is included in both the $\Delta V_{BE}$ over R circuit and the $V_{BE}$ over R circuit to produce the positive temperature coefficient in the first resistor and the negative temperature coefficient current in the second resistor.

* * * * *